United States Patent
Iwano et al.

(10) Patent No.: US 10,557,437 B2
(45) Date of Patent: Feb. 11, 2020

(54) FUEL INJECTION PUMP

(71) Applicant: Yanmar Co., Ltd., Osaka-shi, Osaka-fu (JP)

(72) Inventors: Ryota Iwano, Osaka (JP); Satoshi Hiroya, Osaka (JP); Hiroyuki Machiyama, Osaka (JP); Kosuke Hara, Osaka (JP); Ryosuke Okamoto, Osaka (JP)

(73) Assignee: YANMAR CO., LTD., Osaka (JP)

( * ) Notice: Subject to any disclaimer, the term of this patent is extended or adjusted under 35 U.S.C. 154(b) by 16 days.

(21) Appl. No.: 15/776,934

(22) PCT Filed: Nov. 10, 2016

(86) PCT No.: PCT/JP2016/083418
§ 371 (c)(1),
(2) Date: May 17, 2018

(87) PCT Pub. No.: WO2017/086236
PCT Pub. Date: May 26, 2017

(65) Prior Publication Data
US 2018/0328308 A1    Nov. 15, 2018

(30) Foreign Application Priority Data

Nov. 17, 2015    (JP) ................................. 2015-225202

(51) Int. Cl.
*F02D 41/40*    (2006.01)
*F02D 41/20*    (2006.01)
(Continued)

(52) U.S. Cl.
CPC .......... *F02D 41/406* (2013.01); *F02D 41/064* (2013.01); *F02D 41/20* (2013.01);
(Continued)

(58) Field of Classification Search
CPC ..... F02D 2041/2034; F02D 2041/2055; F02D 41/406; F02D 41/407; F02M 59/36
See application file for complete search history.

(56) References Cited

U.S. PATENT DOCUMENTS

| | | | |
|---|---|---|---|
| 5,375,575 A | * | 12/1994 | Ohishi ................ F02D 41/0085 123/446 |
| 6,745,751 B2 | * | 6/2004 | Seo ....................... F02M 59/022 123/179.17 |

(Continued)

FOREIGN PATENT DOCUMENTS

| | | |
|---|---|---|
| JP | 5-272390 A | 10/1993 |
| JP | H6-003164 B | 1/1994 |

(Continued)

OTHER PUBLICATIONS

International Search Report dated Jan. 24, 2017 issued in corresponding PCT Application PCT/JP2016/083418.

*Primary Examiner* — Kevin R Steckbauer
(74) *Attorney, Agent, or Firm* — Norton Rose Fulbright US LLP

(57) ABSTRACT

A fuel injection pump (100) provided in a diesel engine, including: an electromagnetic spill valve (20) configured to adjust a fuel injection amount by releasing a pressurized fuel with opening/closing of a spill valve body (23); and an ECU (Engine Control Unit, 50) configured to form a current waveform of drive current of the electromagnetic spill valve (20). The ECU (50), during the warm state, detects a valve-close timing of the electromagnetic spill valve (20), forms an optimum current waveform of drive current based on the detected valve-close timing, and applies drive current with thus formed optimum current waveform to the electromagnetic spill valve (20), whereas, during the cold state, the (Continued)

ECU (50) applies only drive current with a pre-set current waveform to the electromagnetic spill valve (20).

4 Claims, 6 Drawing Sheets

(51) Int. Cl.
- *F02M 59/20* (2006.01)
- *F02D 41/06* (2006.01)
- *F02M 59/36* (2006.01)
- *F02M 59/46* (2006.01)

(52) U.S. Cl.
 CPC ......... *F02D 41/407* (2013.01); *F02D 41/408* (2013.01); *F02M 59/20* (2013.01); *F02M 59/366* (2013.01); *F02M 59/466* (2013.01); *F02D 2041/2034* (2013.01); *F02D 2041/2055* (2013.01); *F02D 2041/2058* (2013.01); *F02D 2200/0606* (2013.01); *F02D 2200/101* (2013.01); *Y02T 10/44* (2013.01)

(56) References Cited

U.S. PATENT DOCUMENTS

| | | | |
|---|---|---|---|
| 9,926,878 B2* | 3/2018 | Suzuki | F02D 41/3082 |
| 10,234,496 B2* | 3/2019 | Nair | F02D 41/20 |
| 10,316,785 B2* | 6/2019 | Lee | F02D 41/3005 |
| 2003/0120418 A1* | 6/2003 | Treichel | F02D 41/20 |
| | | | 701/105 |
| 2004/0000289 A1* | 1/2004 | Seo | F02M 59/022 |
| | | | 123/447 |
| 2008/0216797 A1* | 9/2008 | Oono | F02D 41/062 |
| | | | 123/447 |
| 2013/0226488 A1* | 8/2013 | Wirkowski | F02M 59/466 |
| | | | 702/64 |
| 2016/0186707 A1* | 6/2016 | Sakamoto | F02M 63/0049 |
| | | | 417/505 |
| 2016/0186741 A1* | 6/2016 | Sakamoto | F02M 63/0049 |
| | | | 417/290 |
| 2016/0237937 A1* | 8/2016 | Kusakabe | F02D 41/20 |
| 2017/0108139 A1* | 4/2017 | Nieddu | F16K 31/0675 |
| 2017/0234920 A1* | 8/2017 | Nair | F02D 41/20 |
| | | | 361/209 |
| 2017/0292468 A1* | 10/2017 | Lee | F02D 41/3005 |
| 2017/0335787 A1* | 11/2017 | Aono | F02D 41/20 |
| 2018/0023720 A1* | 1/2018 | Traversa | F02M 51/0621 |
| | | | 251/129.15 |
| 2018/0195450 A1* | 7/2018 | Mukaihara | F02M 51/00 |
| 2018/0252752 A1* | 9/2018 | Shahroudi | G01R 19/04 |
| 2018/0328308 A1* | 11/2018 | Iwano | F02D 41/064 |

FOREIGN PATENT DOCUMENTS

| | | |
|---|---|---|
| JP | 8-232686 A | 9/1996 |
| JP | 2003-206819 A | 7/2003 |
| JP | 2008-223528 A | 9/2008 |
| JP | 2013-536365 A | 9/2013 |
| JP | 2015-031203 A | 2/2015 |

* cited by examiner

FUEL INJECTION PUMP

CROSS REFERENCES TO RELATED APPLICATIONS

This application is a national stage application pursuant to 35 U.S.C. § 371 of International Application No. PCT/JP2016/083418, filed on Nov. 10, 2016, which claims priority under 35 U.S.C. § 119 to Japanese Patent Application No. 2015-225202, filed on Nov. 17, 2015, the disclosures of which are hereby incorporated by reference in their entireties.

TECHNICAL FIELD

The present invention relates to a technology of a fuel injection pump.

BACKGROUND ART

A fuel injection pump provided in a diesel engine has traditionally been well-known. Further, an electromagnetic spill valve provided in the fuel injection pump has also been well-known. To the electromagnetic spill valve, drive current whose current waveform is shaped by a control device is applied, and a fuel injection amount is adjusted by releasing pressurized fuel with opening/closing of the valve (e.g., see Patent Literature 1; hereinafter PTL 1).

Traditionally, the control device includes a full automatic mode and a manual mode as means for shaping the current waveform of the drive current of the electromagnetic spill valve. In the full automatic mode, a valve-close (maximum lift) timing of the electromagnetic spill valve is detected, and an optimum current waveform of the drive current is formed based on the detected maximum lift timing. In the manual mode, only the current waveform of the preset drive current is formed.

However, in cases where the diesel engine is operated in a cold state by using fuel oil C having a relatively high viscosity as the fuel, and the current waveform of the drive current of the electromagnetic spill valve is formed in the full automatic mode, a phenomenon in which the drive current collapses may take place. This phenomenon is thought to be caused by the following reason. Namely, a high viscosity of the fuel oil C during the cold state slows down the behavior of the electromagnetic spill valve, and the maximum lift timing cannot be detected.

Further, when such a phenomenon takes place in the diesel engine, it is confirmed that the normal waveform of the flowing current is not restored even if the engine is operated for a long time in a steady state (i.e., in the state where the fuel viscosity is sufficiently low).

CITATION LIST

Patent Literature

PTL 1: Japanese Examined Patent Application Publication No. H6-003164 (1994)

SUMMARY OF INVENTION

Technical Problem

An object of the present invention is to provide a fuel injection pump that can control the valve behavior by accurately detecting a valve-close timing even if the fuel viscosity is high.

Solution to Problem

A fuel injection pump according to an aspect of the present invention is a fuel injection pump provided in a diesel engine, including: an electromagnetic spill valve configured to adjust a fuel injection amount by releasing pressurized fuel with opening/closing of a valve body; and a control device configured to form a current waveform of drive current of the electromagnetic spill valve, wherein during a warm state, the control device detects a time of opening the valve body of the electromagnetic spill valve as a first timing, detects a value of flowing current at the time of opening the valve body as a first current value, detects a time of closing the valve body of the electromagnetic spill valve as a second timing, detects a value of flowing current at the time of closing the valve body as a second current value, after closing the valve body, shapes a current waveform of the drive current so that the value of current in the electromagnetic spill valve returns from the second current value to the first current value, within a period equivalent to a time elapsed from the second timing to the first timing, and applies the drive current with the shaped current waveform to the electromagnetic spill valve, and wherein, during a cold state, the control device applies only drive current with a pre-set current waveform to the electromagnetic spill valve.

The fuel injection pump of the aspect of the present invention preferably includes a fuel temperature detector configured to detect a fuel temperature of fuel passing through the electromagnetic spill valve, wherein the control device determines, as the warm state, if the fuel temperature equals to or higher than a predetermined temperature, and determines, as the cold state, if the fuel temperature is less than the predetermined temperature.

The fuel injection pump of the aspect of the present invention is preferably such that the control device determines, as the warm state, if an engine speed at the time of starting the engine is equal to or higher than a predetermined engine speed, and determines, as the cold state, if the engine speed at the time of starting the engine is lower than the predetermined engine speed.

The fuel injection pump of the aspect of the present invention is preferably such that the control device determines, as the warm state, after elapse of a predetermined period from the starting of the engine, and determines, as the cold state, until the elapse of the predetermined period.

Advantageous Effects of Invention

With the fuel injection pump of the aspect of the present invention, a valve-close timing can be accurately detected, and the valve behavior can be controlled, even if the fuel viscosity is high.

DESCRIPTION OF EMBODIMENTS

Figure 1:
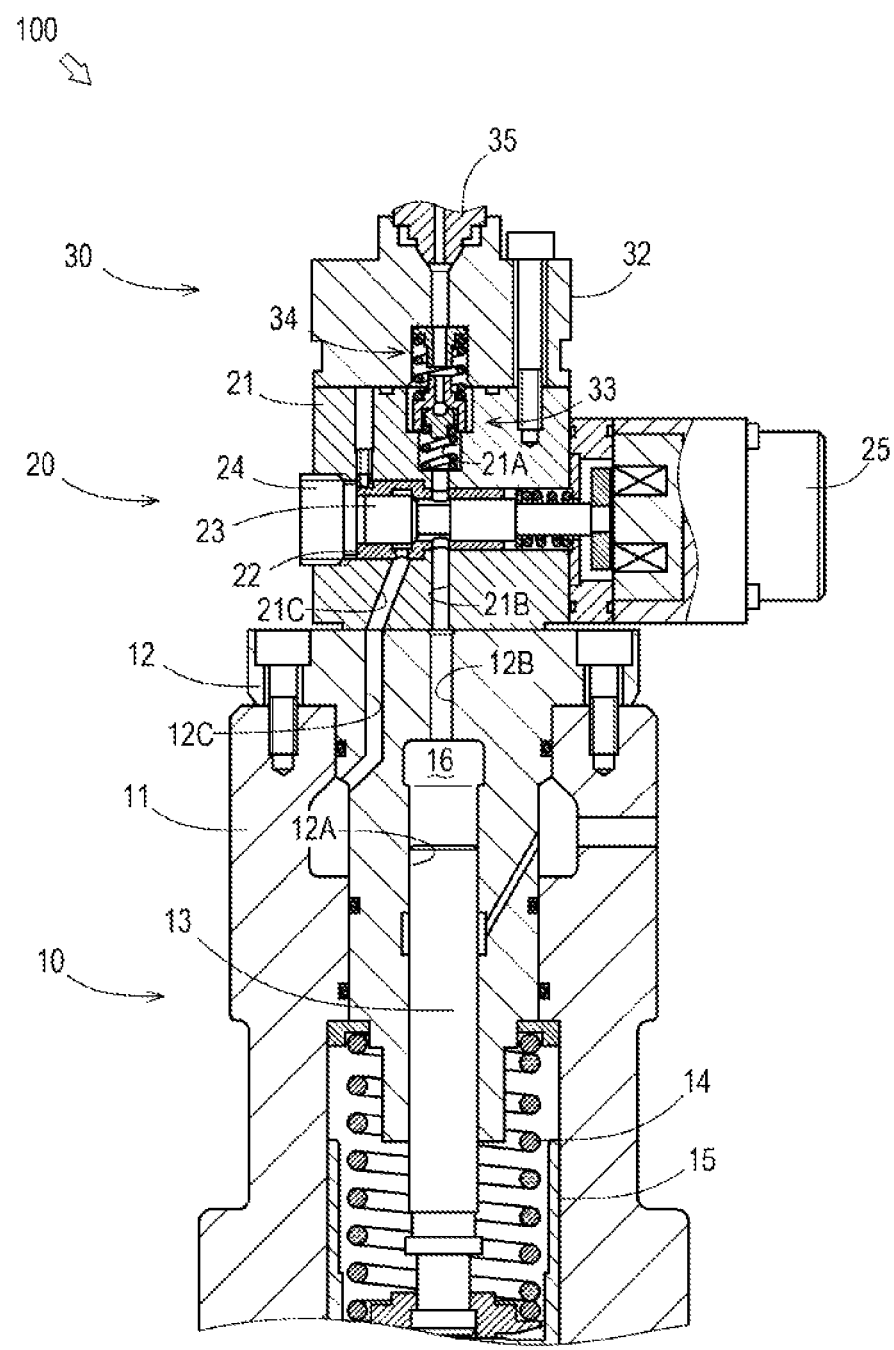
FIG. 1 A schematic diagram showing a structure of a fuel injection pump.

With reference to FIG. 1, the following describes a structure of a fuel injection pump 100.

FIG. 1 schematically shows a structure of a fuel injection pump 100.

The fuel injection pump 100 of the present embodiment is to be provided in each cylinder of a large diesel engine mounted in a ship. It is supposed that the fuel injection pump 100 of the present embodiment uses fuel oil C as its fuel.

The fuel injection pump 100 is connected to a not-shown low-pressure pump (feed pump) and pressurizes and feeds fuel from the low-pressure pump to a not-shown fuel injection nozzle. The fuel injection pump 100 includes a pump main body part 10, an electromagnetic spill valve 20, and a two-way delivery valve part 30.

The pump main body part 10 includes: a pump main body upper portion 11 formed in a substantially cylindrical shape; a barrel 12 having therein a plunger 13 which is provided in such a manner as to be slidable in an axial direction; the plunger 13 which pressurizes fuel; a plunger spring 14 which biases the plunger 13 downwards; a tappet 15 for transmitting a pressing force from a not-shown cam to the plunger 13; and the not-shown cam.

In the axial portion of the barrel 12, a plunger hole 12A for providing the plunger 13 therein is formed with its lower end portion opened. In an axial portion of the barrel 12 and above the plunger hole 12A, a first fuel supply path 12B is formed so as to extend in the vertical direction. An upper end surface of the plunger 13 and the plunger hole 12A form a pressurizing chamber 16. In the barrel 12, a first spill-oil discharge passage 12C is formed so as to extend substantially in the vertical direction, on a radially outside of the first fuel supply path 12B.

The electromagnetic spill valve 20 adjusts the fuel injection amount and the injection timing of the fuel injection pump 100. The electromagnetic spill valve 20 includes a housing 21, an insert piece 22, a spill valve body 23, an end cap 24, and a solenoid 25.

The housing 21 is a structure that constitutes the main body portion of the electromagnetic spill valve 20. The housing 21 is formed in a substantially rectangular parallelepiped shape. In an upper portion of the housing 21, a two-way delivery valve spring chamber 21A is formed in the vertical direction. In a lower portion of the housing 21, a second fuel supply path 21B is formed in the vertical direction. In the housing 21, a second spill-oil discharge passage 21C is formed in the vertical direction, on the left side of the second fuel supply path 21B.

The two-way delivery valve part 30 ejects fuel or maintains a post-injection fuel pressure inside a high-pressure pipe joint 35 at a predetermined value. The two-way delivery valve part 30 includes a two-way delivery valve main body 32, an ejection valve 33, a two-way delivery valve 34, and the like. Further, the two-way delivery valve part 30 is connected to the high-pressure pipe joint 35.

With this structure, the fuel in the pressurizing chamber 16 is pressurized by the plunger 13 which slides upward with the rotation of a not-shown cam and is fed sequentially from the pressurizing chamber 16 to the first fuel supply path 12B, and the second fuel supply path 21B of the housing 21.

When the fuel injection pump 100 ejects the fuel, the solenoid 25 of the electromagnetic spill valve 20 is excited based on a signal from an Engine Control Unit (Hereinafter, ECU) 50 (see FIG. 2). The spill valve body 23 of the electromagnetic spill valve 20 is slid rightward by the suction force of the solenoid 25. Then, a sealing surface of the spill valve body 23 is seated on a valve seat of the insert piece 22.

At this time, the communication between the second fuel supply path 21B and the second spill-oil discharge passage 21C of the housing 21 is shuttered, and the fuel pressure in the second fuel supply passage 21B is maintained without being released through the second spill-oil discharge passage 21C. Then, the pressurized fuel is filled from the pressurizing chamber 16 into the two-way delivery valve spring chamber 21A through the first fuel supply path 12B and the second fuel supply path 21B. That is, the electromagnetic spill valve 20 is closed and the fuel can be supplied.

Figure 2:
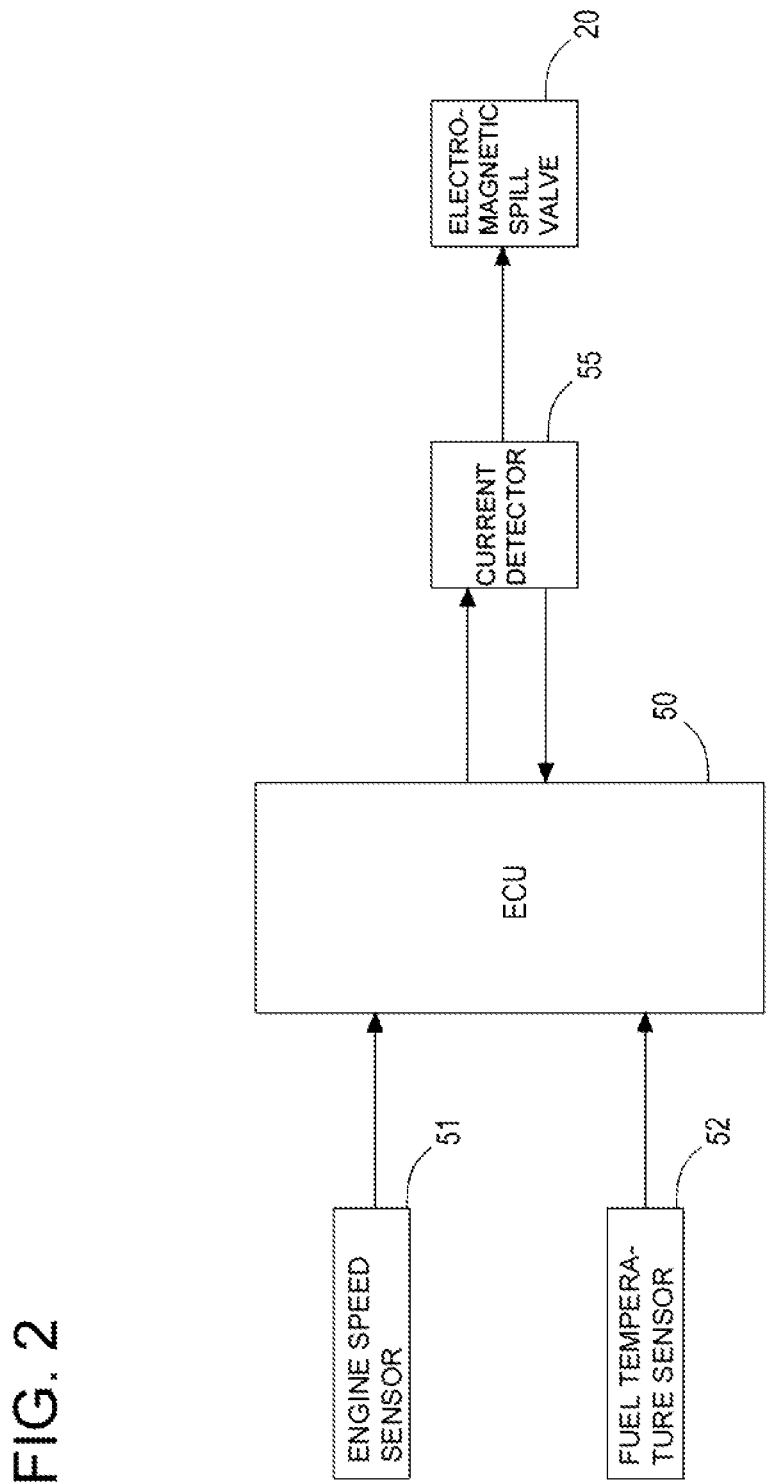
FIG. 2 A block diagram showing a control structure of an electromagnetic spill valve.

On the other hand, when the fuel injection pump 100 stops ejection of the fuel, the solenoid 25 of the electromagnetic spill valve 20 is demagnetized based on a signal from the ECU 50 (see FIG. 2). The spill valve body 23 of the electromagnetic spill valve 20 is slid leftward until it abuts an abut surface of the end cap 24 of the spill valve body 23. As a result, the second fuel supply path 21B and the second spill-oil discharge passage 21C of the housing 21 are communicated with each other, and the fuel pressure in the second fuel supply passage 21B is released through the second spill-oil discharge passage 21C.

The following describes a control structure of the electromagnetic spill valve 20, with reference to FIG. 2.

It should be noted that, in FIG. 2, the control structure of the electromagnetic spill valve 20 is represented by a block diagram.

The electromagnetic spill valve 20 is connected to the ECU 50 via a current detector 55. To the electromagnetic spill valve 20, drive current whose current waveform is shaped by the ECU50 is applied. The ECU 50 is connected to an engine speed sensor 51 and a fuel temperature sensor 52.

The current detector 55 detects the flowing current supplied to the electromagnetic spill valve 20. It should be noted that the flowing current includes the drive current, the counter electromotive force of the solenoid 25, and the like. The engine speed sensor 51 is provided nearby a flywheel of the diesel engine and detects the engine speed NE. The fuel temperature sensor 52 is provided in a fuel passage nearby the electromagnetic spill valve 20, and detects the fuel temperature TN.

The ECU50 inclusively controls the diesel engine and shapes the current waveform of the drive current which drives the electromagnetic spill valve 20. Further, the ECU 50 includes a full automatic mode and a manual mode as means for shaping the current waveform of the drive current.

Figure 3A:
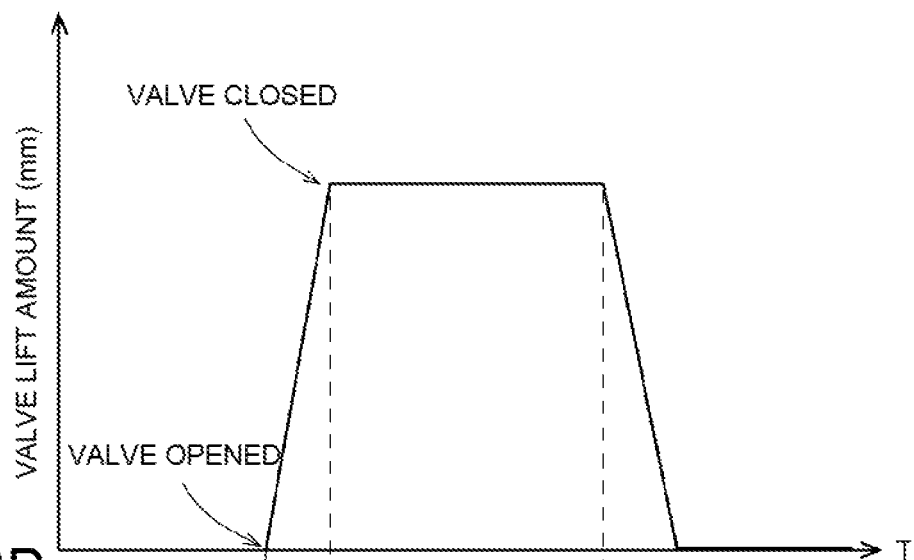
FIG. 3A and FIG. 3B Graph diagrams showing drive current and flowing current of the electromagnetic spill valve.
Figure 3B:
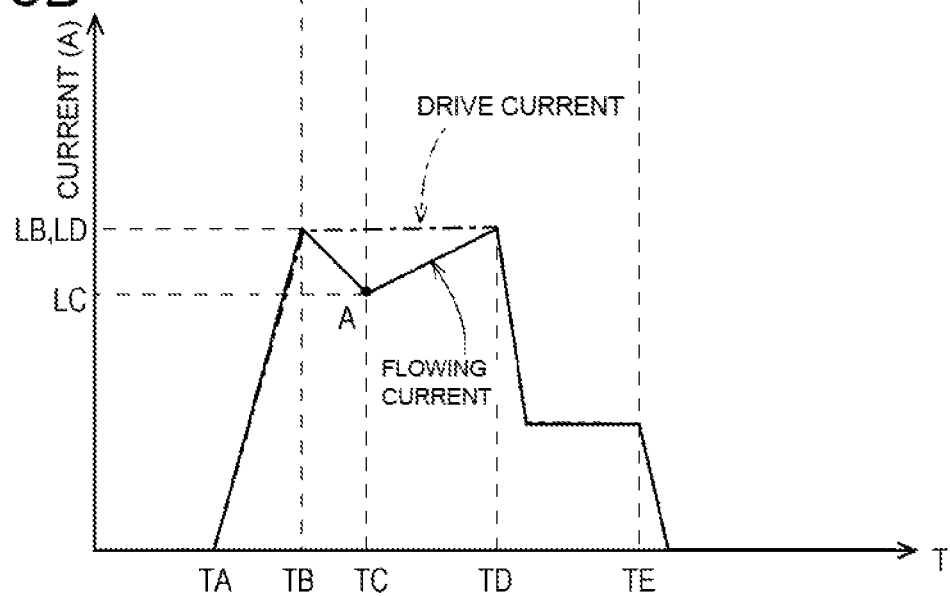

The following describes the flowing current and the drive current of the electromagnetic spill valve 20, with reference to FIG. 3A and FIG. 3B.

It should be noted that FIG. 3A is a time series graph showing the lift amount of the spill valve body 23 of the electromagnetic spill valve 20, whereas FIG. 3B is a time series graph showing the flowing current (solid line) and the drive current (broken line) of the electromagnetic spill valve 20.

As shown in FIG. 3A and FIG. 3B, a time lag occurs in the actual behavior of the spill valve body 23 of the electromagnetic spill valve 20 with respect to the flowing current of the electromagnetic spill valve 20.

In the full automatic mode, the current detector 55 detects current values IB, IC and predetermined times TB, TC, and TD and performs feedback control for correcting them to an optimum value. Specifically, the current waveform between TB and TC is fed back, and the same current waveform with the time axis of TC as the axis of symmetry is formed between TC and TD.

Specifically, between TB and TC, a counter electromotive force of the flowing current is generated as the drive current. Then, between the TC-TD, the current waveform is formed based on the fed back changes in the current value and the time between the TB-TC. At this time, with the current waveform having a V-shape, point A (point of valve closing) can be detected. It should be noted that TA and TE are values determined based on a map, according to the engine load.

Here, when the fuel viscosity is high, the current waveform between TB-TC and the current waveform between TC-TD forms an asymmetrical V-shape with respect to the time axis of TC, as compared with a symmetrical V-shape formed when the fuel viscosity is low.

In the manual mode, the current waveform of the drive current is formed only by a pre-set current values IB and IC, and predetermined times TB, TC, and TD. It should be noted that the pre-set current values IB and IC, and the predetermined times TB, TC, and TD are stored in the ECU50 in advance.

Figure 4:
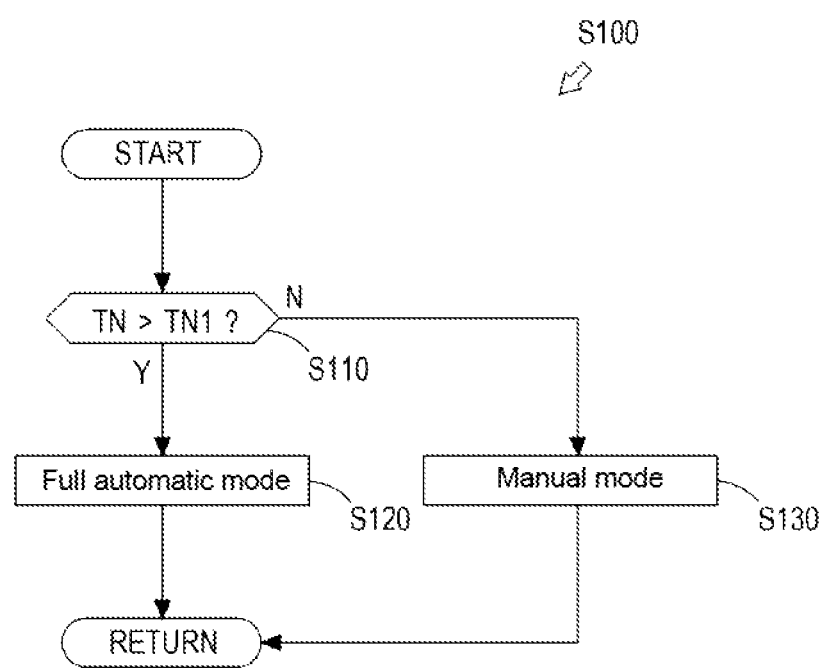
FIG. 4 A graph diagram showing a flow of drive current control of a first embodiment.

The following describes a drive current control S100, with reference to FIG. 4.

It should be noted that FIG. 4 is a flowchart showing a flow of the drive current control S100.

In the drive current control S100, the ECU 50 switches the means for shaping the current waveform between the full automatic mode and the manual mode based on the fuel temperature TN. In step S110, the ECU 50 determines whether the fuel temperature TN is higher than a predetermined temperature TN1. The process proceeds to step S120 if the fuel temperature TN is higher than the predetermined temperature TN1, whereas the process proceeds to step S130 if the fuel temperature TN is equal to or lower than the predetermined temperature TN1.

In step S120, the ECU50 shapes the current waveform of the drive current in the full automatic mode. In step S130, the ECU50 shapes the current waveform of the drive current in the manual mode. In the present embodiment, the predetermined temperature TN1 is 110° C.

An effect of the drive current control S100 is as follows.

With the drive current control S100, the current waveform of the current flowing in the electromagnetic spill valve 20 can be prevented from collapsing, even if the fuel viscosity is high. That is, when the fuel temperature TN is equal to or lower than the predetermined temperature TN1, the fuel viscosity of the fuel oil C is expected to be high. In this case, the means for shaping the current waveform of the drive current to the manual mode, and the current waveform of the current flowing in the electromagnetic spill valve 20 can be prevented from collapsing.

Figure 5:
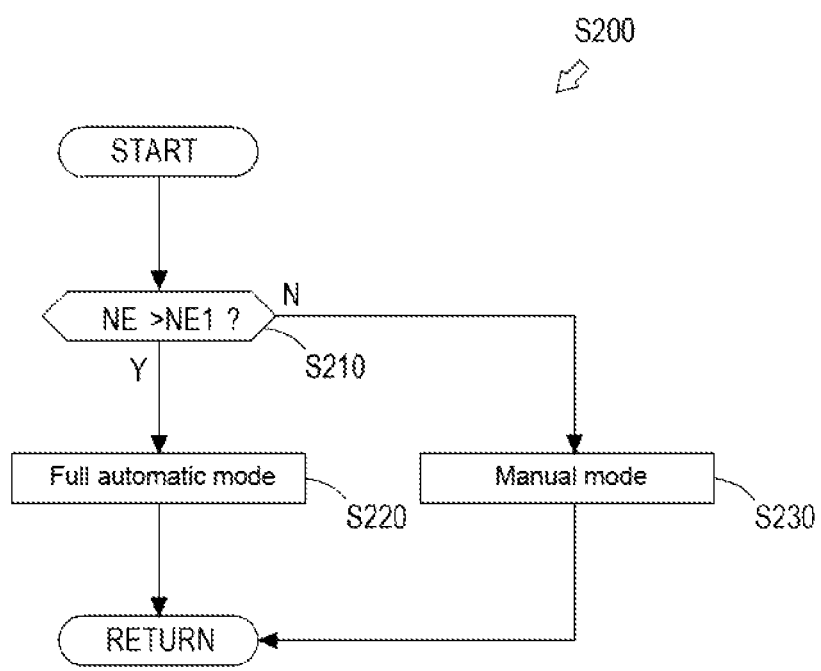
FIG. 5 A graph diagram showing a flow of drive current control of a second embodiment.

The following describes a drive current control S200, with reference to FIG. 5.

It should be noted that FIG. 5 is a flowchart showing a flow of the drive current control S200.

In the drive current control S200, the ECU 50 switches the means for shaping the current waveform between the full automatic mode and the manual mode based on the engine speed NE. In step S210, the ECU 50 determines whether the engine speed NE is higher than a predetermined engine speed NE1. The process proceeds to step S220 if the fuel engine speed NE is higher than the predetermined engine speed NE1, whereas the process proceeds to step S230 if the engine speed NE is equal to or lower than the predetermined engine speed NE1.

In step S220, the ECU50 shapes the current waveform of the drive current in the full automatic mode. In step S230, the ECU50 shapes the current waveform of the drive current in the manual mode. In the present embodiment, the predetermined engine speed NE1 is 720 rpm.

An effect of the drive current control S200 is as follows.

With the drive current control S200, the current waveform of the current flowing in the electromagnetic spill valve 20 can be prevented from collapsing, even if the fuel viscosity is high. That is, when the engine speed NE is equal to or lower than the predetermined engine speed NE1, the fuel viscosity of the fuel oil C is expected to be high. In this case, the means for shaping the current waveform of the drive current to the manual mode, and the current waveform of the current flowing in the electromagnetic spill valve 20 can be prevented from collapsing.

Figure 6:
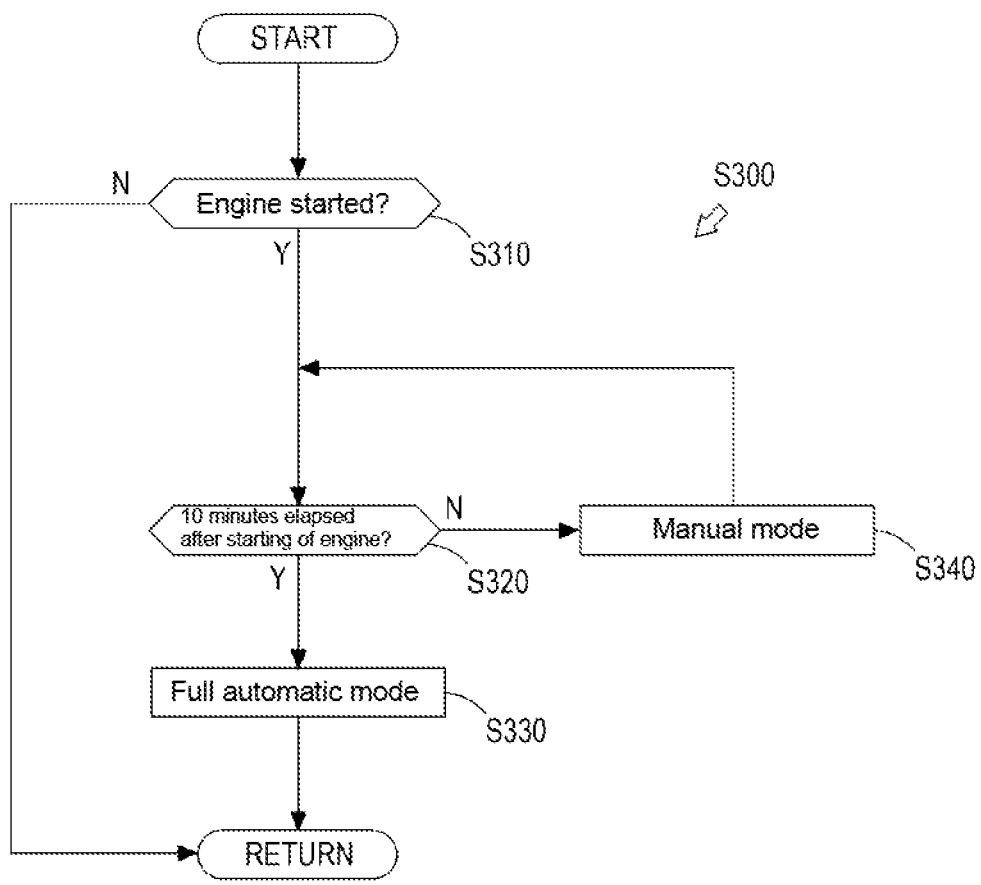
FIG. 6 A graph diagram showing a flow of drive current control of a third embodiment.

The following describes a drive current control S300, with reference to FIG. 6.

It should be noted that FIG. 6 is a flowchart showing a flow of the drive current control S300.

In the drive current control S300, the ECU 50 switches the means for shaping the current waveform between the full automatic mode and the manual mode based on the time elapsed after starting of the engine. In step S310, the ECU 50 determines whether the diesel engine has been started. When the diesel engine is started, the process proceeds to step S320.

In step S320, the ECU 50 determines whether 10 minutes have elapsed from the starting of the engine. The process proceeds to S330 if 10 minutes has elapsed from the starting of the engine, whereas the process proceeds to step S340 if 10 minutes has not yet elapsed from the start of the engine. In step S330, the ECU50 shapes the current waveform of the drive current in the full automatic mode. In step S340, the ECU50 shapes the current waveform of the drive current in the manual mode.

An effect of the drive current control S300 is as follows.

With the drive current control S300, the current waveform of the current flowing in the electromagnetic spill valve 20 can be prevented from collapsing, even if the fuel viscosity is high. That is, if the time elapsed from the starting of the diesel engine is less than 10 minutes, the fuel viscosity of the fuel oil C is expected to be high. In this case, the means for shaping the current waveform of the drive current to the manual mode, and the current waveform of the current flowing in the electromagnetic spill valve 20 can be prevented from collapsing.

INDUSTRIAL APPLICABILITY

The present invention is applicable to a fuel injection pump.

REFERENCE SIGNS LIST

20 electromagnetic spill valve
23 spill valve body
50 ECU (control device)
100 fuel injection pump

The invention claimed is:
1. A fuel injection pump provided in a diesel engine, comprising:

an electromagnetic spill valve configured to adjust a fuel injection amount by releasing pressurized fuel with opening/closing of a valve body; and a control device configured to form a current waveform of drive current of the electromagnetic spill valve, wherein, during a warm state, the control device detects a time of opening the valve body of the electromagnetic spill valve as a first timing, detects a value of flowing current at the time of opening the valve body as a first current value, detects a time of closing the valve body of the electromagnetic spill valve as a second timing, detects a value of flowing current at the time of closing the valve body as a second current value; after closing the valve body, shapes a current waveform of the drive current so that a value of current in the electromagnetic spill valve returns from the second current value to the first current value, within a period equivalent to a time elapsed from the first timing to the second timing; and applies the drive current with the shaped current waveform to the electromagnetic spill valve, and wherein, during a cold state, the control device applies only drive current with a pre-set current waveform to the electromagnetic spill valve.

2. The fuel injection pump according to claim 1, comprising
a fuel temperature detector configured to detect a fuel temperature of fuel passing through the electromagnetic spill valve,
wherein the control device determines, as the warm state, if the fuel temperature equals to or higher than a predetermined temperature, and determines, as the cold state, if the fuel temperature is less than the predetermined temperature.

3. The fuel injection pump according to claim 1, wherein the control device determines, as the warm state, if an engine speed at the time of starting the engine is equal to or higher than predetermined engine speed, and determines, as the cold state, if the engine speed at the time of starting the engine is lower than the predetermined engine speed.

4. The fuel injection pump according to claim 1, wherein the control device determines, as the warm state, after elapse of a predetermined period from the starting of the engine, and determines, as the cold state, until the elapse of the predetermined period.

* * * * *